Sept. 6, 1960 A. KRAMISH 2,951,942
NUCLEAR RADIOMETER FOR NEUTRON FLUX MEASUREMENT
Filed Nov. 30, 1955
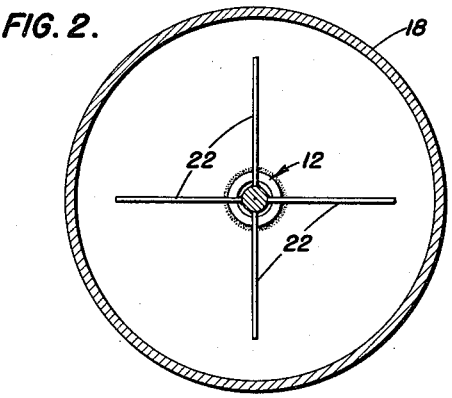
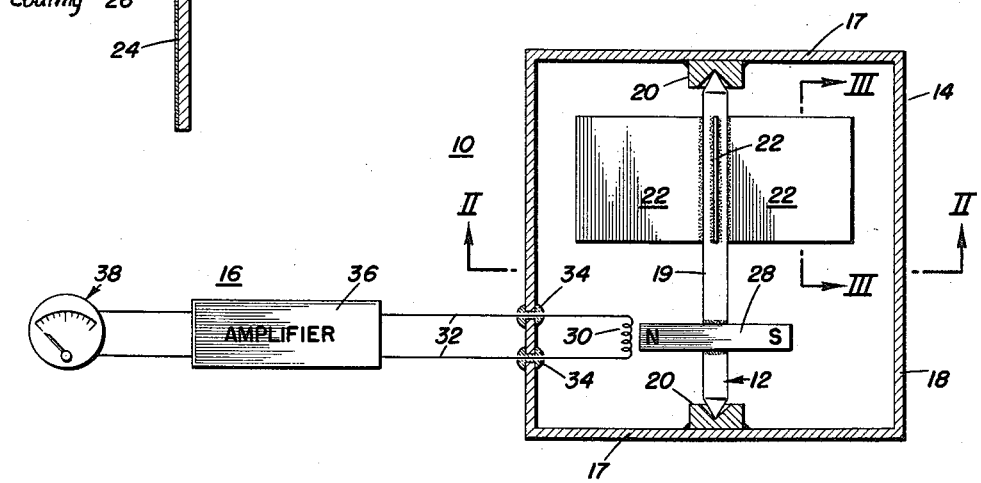
INVENTOR
Arnold Kramish
BY Leech and Radue
ATTORNEYS

United States Patent Office 2,951,942
Patented Sept. 6, 1960

2,951,942
NUCLEAR RADIOMETER FOR NEUTRON FLUX MEASUREMENT

Arnold Kramish, 3633 Everett St. NW., Washington, D.C.

Filed Nov. 30, 1955, Ser. No. 550,098

9 Claims. (Cl. 250—83.1)

The present invention relates to a nuclear radiometer for neutron flux measurement. Unlike the familiar solar radiometer, the instrument of this invention is adapted to produce measurable mechanical motion from nuclear reactions, and does not depend upon solar radiation. It will be helpful, however, to explain the principles of operation of the solar radiometer before describing the invention here involved.

In the solar radiometer a spaced set of vanes is mounted coplanar with the axis of a fine vertical shaft rotatably mounted in a partially evacuated glass chamber. Ordinarily one side of each vane is blackened and when the apparatus is exposed to thermal radiation from the sun or an artificial source the vanes and their shaft will rotate. The driving or propelling force is obtained by reason of the blackening which provides greater absorption and preferential heating by the sun or equivalent radiant energy of the thermal type. Thus the molecules of gas in the glass chamber upon striking the vanes rebound with greater force from the more heated blackened sides than from the less heated sides. In this manner directional kicks are given to each of the vanes in the same direction and the shaft mounted assembly is caused to rotate.

The nuclear radiometer as herein disclosed employs a nuclear radiation source to produce preferential heating of the unique vane structure involved. When such a nuclear radiometer is used as a neutron flux measuring device, the nuclear radiation will be continuously produced in the several vanes by the action of a strong nectron flux striking the vanes.

The problem of providing an adequate vane structure for such nuclear radiometers involves several factors that must be dealt with adequately if an instrument of the required accuracy and dependability is to be provided. In the first instance the principal structural element of the vane must have limited heat conductivity, that is, a relatively low coefficient of heat conductivity. The requirements for a vane body portion of a reactive substance in which the nuclear reaction will occur are especially exacting. It is a primary necessity that there be included in the vane an isotopic material of high neutron capture probability to provide for the emission of radioactive particles of extremely short range in the reactive body portion itself in order that most of the radiation be stopped in one side of the vane so as to produce preferential heating for rotation causing effect. In this connection it is preferable to use a supplementary coating having radiation stopping properties on the outer side of the particular neutronic reactive substance, such coating having a higher coefficient of heat conductivity relative to that of the main structural element.

For neutron flux measurement it is essential that there be in the vanes of the nuclear radiometer an adequate amount of isotopic material having high probability of a nuclear reaction upon neutron capture. When the radiometer is placed in a strong neutron flux, the neutrons will react with the atoms in the surface of the vane, the reaction products will heat that surface, and the vane structure carried by a shaft will rotate at a rate dependent on design and intensity of the neutron flux.

With these objectives and principles in view, this invention will be more fully understood from the following detailed description of a preferred embodiment thereof, when taken in connection with the accompanying drawing, in which:

Fig. 1 is a vertical section view of the radiometer, showing also in somewhat diagrammatic form a measuring means to be used with the same;

Fig. 2 is a horizontal section view of the radiometer of Fig. 1 taken on line II—II; and Fig. 3 is an enlarged vertical section of one of the vanes.

In the drawings, a radiometer constructed in accordance with the principles of this invention is designated generally by the numeral 10 in Fig. 1. The radiometer 10 has as its principal components a rotor member 12 mounted for rotation about a vertical axis within a sealed casing 14. An indicator or measuring means identified generally by the numeral 16 is associated with the rotor member 12 so as to respond to its rotational movement. The structure shown in the drawings resembles in several ways that of the familiar solar radiometer.

The details of a preferred embodiment of the radiometer of this invention will be described with reference to Figs. 1, 2 and 3. It is highly desirable that the cylindrical, sealed instrument casing 14 be constructed of neutron-transparent material, and that the atmosphere surrounding the rotor member be of a composition that will absorb neutrons as little as possible, to the end that efficiency of the instrument be impaired as little as possible. Therefore, the casing 14 is fashioned of hafnium-free zirconium metal, and, after evacuation, filled with gaseous helium, which has a fairly low neutron capture probability. A practical way of fabricating the cylindrical casing 14 is to weld circular end plates 17, 17 over the ends of a cylindrical shell 18, using hafnium-free zirconium as the weld metal.

A slender shaft 19 of the same zirconium metal is mounted with clockwork precision coaxially within the casing 14 by means of an aligned pair of step bearings 20, 20 secured respectively to the inner sides of the end plates 17, 17 by using a weld metal of hafnium-free zirconium.

As shown in Figs. 1 and 2, a plurality of vanes 22 in the form of composite rectangular plates are carried by the relatively slim precision shaft 19 intermediate the bearings 20, 20 for rotation in response to an impinging neutron flux. Four identical metal vanes 22 of square outline having an area of one square inch (6.45 sq. cm.) are secured in equally spaced relation to the shaft 19 by welding with hafnium-free zirconium metal, as indicated in Fig. 1. Silver brazing may also be used for this purpose.

The composition and construction of the rotor vanes 22 for use in a nuclear radiometer are the most important features of this invention. There are two requirements, one basic and the other secondary: The principal body portion 24 of the vane (22) must be neutronic reactive, and preferably the outer face of the said body portion 24 that is arranged to receive a neutronic bombarding flux, should be provided with an even thinner layer 26 of radiation stopping material, such as may be produced by a flash coating of nickel carbonyl. For reasons to be explained more fully, boron-10 ($B^{10}$) is preferred as the neutronic reactive material for the vane body portion 24, although uranium-235 ($U^{235}$) and other fissionable isotopic equivalents such as uranium-233 ($U^{233}$) and plutonium-239 ($Pu^{239}$) may be employed. The principal body portion 24 is supported by a much thicker layer 27 of zirconium metal which may be of commercial grade, although hafnium-free zirconium would be preferred.

In the exemplary radiometer 10 the body portion 24 has a thickness of 0.01 cm., the flashed layer 26 is of the order of 0.001 cm. in thickness, and the supporting layer 27 is 0.10 cm. in thickness. The supporting layer 27 is etched to receive the boron-10 as a vacuum flashed coating.

Measurement of the rate of vane rotation with the shaft 19 is made by use of a magnet 28 and a co-operating coil 30. For this purpose a magnet 28 having a bar form is firmly secured transversely between lower end portions of the shaft 19, by welding at top and bottom sides as indicated, using hafnium-free zirconium metal. The ends of the small bar magnet 32 rotate past the coil 30 and induce a measurable current therein in accordance with the neutronic flux density to which the instrument is exposed.

The bar magnet 28 has very high and permanent magnet strength for its weight, such as is obtainable with hard "Alnico" magnetic material, which is composed of aluminum, nickel and iron. Such a magnet does not lose magnetism upon moderate heating under neutron bombardment.

A pair of electric conductors 32, 32 are led from opposite ends of the coil 30, which is disposed closely adjacent the path of rotation of the ends of magnet 28, through respective seal elements 34, 34 mounted in spaced relation in the cylindrical wall of the gas-filled casing 14 to an electrical current amplifier 36 of conventional type, and finally to the electrical indicating and measuring instrument 38. The pointer of the instrument 38 is positioned proportionately to the speed of rotation of the bar magnet 28 with the vane 22 and hence measures the neutron flux density to which said vanes are subjected.

Further consideration will be given to the particular suitability of the boron-10 isotope as the neutronic reactive material in the vanes. When $B^{10}$ captures a neutron (n), it splits into helium-4 ($He^4$) and lithium-7 ($Li^7$) with an energy release of about 2.9 million electron volts. The reaction is expressed symbolically as follows:

$$B^{10} + n \rightarrow He^4 + Li^7 + 2.9 \text{ m.e.v.}$$

(The energy release is based on nuclear binding energy values given in "Nuclear Forces," by Rosenfeld, 1949.)

The weight, W, of $B^{10}$ and the neutron flux, $nv$, required to produce a "curie rate of decay" in the vanes are related thusly:

$$\frac{6 \times 10^{23}}{10}(W)(\sigma)(nv) = 3.7 \times 10^{10}$$

where $\sigma$ is the cross section for the reaction utilized. For thermal neutrons, the cross sections $3.9 \times 10^{-21}$ cm.$^2$.

Hence, collecting factors, we have as the requirement for a curie rate ($3.7 \times 10^{10}$ disintegrations per second) of reaction:

$$(W)(nv) = 1.58 \times 10^8$$

The practicability of the instrument of this invention can be demonstrated by a comparative study of radioisotope and solar power. While the radiometer effect can be produced with heat fluxes less than the solar constant equivalent, the following calculations are made on the solar constant basis in order to compare the nuclear radiometer of this invention with a known workable standard.

An isotope with a simple emission structure emits per curie per second $$3.7 \times 10^{10} \cdot E \text{ m.e.v.}$$

where E is the mean energy of the radiation in m.e.v. This is equivalent to $$(3.7 \times 10^{10} E)(1.6 \times 10^{-6}) = 5.92 \times 10^4 E \text{ ergs/sec.}$$
$$= 5.92 \times 10^{-3} E \text{ watts per curie}$$

Suppose that radioisotope power can be utilized with an over-all efficiency $\epsilon_1$, and solar power at the earth's surface can be utilized with an efficiency $\epsilon_2$.

Now 1 watt=14 cal./min.

Hence, radioisotope power=$5.92 \times 10^{-3} E \epsilon_1$, (14)=8.4 $\times 10^{-2} E \epsilon_1$ cal./curie/min.

The solar constant is 2 cal./cm.$^2$/min. If this is utilized over an area A with an efficiency $\epsilon_2$ and is equated to a radioisotope source of C curies, then $$8.4 \times 10^{-4} EC\epsilon_1 = 2A\epsilon_2 \text{ or } EC\epsilon_1 = 24A\epsilon_2$$

Thus if the average energy of a source is 1 m.e.v. and two equally efficient isotope and solar sources are compared, it will take 24 curies/cm.$^2$ for equal power.

Based on the determination that it will take 24 curies per cm.$^2$ for equal power, it is found that the requirement for vane heating equivalent to the solar constant is

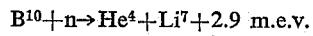
$$W(nv) = 1.58 \times 10^8 \left(\frac{24}{2.9}\right) = 1.3 \times 10^9$$

With usual neutronic reactor fluxes of the order of $10^{11}$ to $10^{12}$ neutrons per cm.$^2$, per second, it follows that the neutronically reactive vane layers need contain only of the order of 0.001 to 0.01 of a gram of $B^{10}$. Since according to the Oak Ridge National Laboratory Isotope Catalog the cost of 96% pure $B^{10}$ is only fifteen dollars per gram, this item will be an insignificant part of the over-all cost of the instrument. By using even larger amounts of $B^{10}$ in the vane layers it would be possible to monitor even smaller neutronic fluxes.

While istopically separated $B^{10}$ is preferred for use in the vane structure, it is entirely practical to use chemically pure boron (which as commercially available contains $B^{10}$ in the amount of 18.8% by weight), with some loss in heating efficiency and some reduction in cost.

Having thus described my invention, what I claim as novel and desire to secure by Letters Patent of the United States is:

1. A nuclear radiometer, responsive to neutrons, comprising a sealed casing of material transparent to neutrons, an operating gas of low neutron capture probability within the casing, a rotor member pivotally mounted for axial rotation within the casing, and a set of vanes fixedly secured on the rotor member with their surfaces extending radially of the rotor member, each vane comprising a layer-type structure of two materials with differing coefficients of heat conductivity as the respective outer layers and between which is contained an isotopic material of high neutron capture probability reacting upon neutron capture to produce emission of radioactive particles of extremely short range that are nearly all stopped within the material having the higher coefficient of heat conductivity, thereby causing preferential heating of said side over the side having a lower coefficient of conductivity, and said outer layers of higher coefficient of heat conductivity being arranged all on the same side of each of the vanes thereby causing rotational movement of said rotor member at a speed representative of the number of neutrons striking the isotopic material.

2. A nuclear radiometer comprising a sealed casing of material transparent to neutrons, an operating gas of low neutron capture probability within the casing, a rotor member pivotally mounted for axial rotation within the casing, a set of vanes fixedly secured on the rotor member with their surfaces extending radially and being coplanar with the axis of rotation of the rotor member, each vane comprising an isotopic material of high neutron capture probability reacting upon neutron capture to produce emission of radioactive particles of extremely short range that are nearly all stopped within an extremely thin coating on the same side of each of the vanes and thereby cause preferential heating of said side and rotational movement of said rotor member, magnet means rotating with the rotor member within the casing, and a coil coupled with said magnet means to produce a signal representative of speed of rotor member rotation.

3. A nuclear radiometer having a rotor vane comprising a supporting layer of material having a low coefficient of heat conductivity upon one surface of which is a layer of isotopic material of high neutron capture probability reacting upon neutron capture to cause emission of radioactive particles of extremely short range, and upon the layer of isotopic material a layer of reaction particle stopping material capable of stopping practically all of said radioactive particles within its side of the vane and which has a higher coefficient of heat conductivity than the supporting layer, thereby causing preferential heating of said side and rotational movement of the rotor member of the radiometer.

4. The nuclear radiometer as claimed in claim 3 in which the isotopic material is boron-10.

5. The nuclear radiometer as claimed in claim 3 in which the isotopic material is uranium-235.

6. The nuclear radiometer as claimed in claim 3 in which the isotopic material is uranium-233.

7. The nuclear radiometer as claimed in claim 3 in which the isotopic material is plutonium-239.

8. A nuclear radiometer rotor vane comprising a layer of zirconium metal, a thinner layer of boron-10-containing material on one face of said layer of zirconium metal, and a flash coating of nickel carbonyl on the other face of the layer of said boron-10 material.

9. The combination of claim 3, including indicating means arranged to measure the response of the rotor vanes to neutron flux.

References Cited in the file of this patent

UNITED STATES PATENTS

| | | |
|---|---|---|
| 2,579,994 | Zinn | Dec. 25, 1951 |
| 2,677,772 | Moon | May 4, 1954 |
| 2,714,668 | Zinn | Aug. 2, 1955 |
| 2,745,284 | Fitzgerald et al. | May 15, 1956 |

OTHER REFERENCES

Furry et al.: Physics, published 1952 by Blakiston Co. (pp. 187–188 and pp. 357–358 relied on).